United States Patent [19]

Watson

[11] 4,284,063
[45] Aug. 18, 1981

[54] SOLAR POWER GENERATING SYSTEM

[76] Inventor: John C. Watson, 2601 E. Monroe, Orange, Calif. 92667

[21] Appl. No.: 32,131

[22] Filed: Apr. 23, 1979

[51] Int. Cl.³ .............................................. F24J 3/02
[52] U.S. Cl. ................................... 126/425; 126/440; 60/641 AB
[58] Field of Search ...................... 126/424, 425, 440; 60/641

[56] References Cited

U.S. PATENT DOCUMENTS

| | | | |
|---|---|---|---|
| 1,014,972 | 1/1912 | Nichols | 126/438 |
| 2,872,915 | 2/1959 | Bowen | 60/641 |
| 2,902,028 | 9/1959 | Manly | 126/424 |
| 3,305,686 | 2/1967 | Carter et al. | 126/425 |
| 4,079,591 | 3/1978 | Derby et al. | 60/641 |
| 4,086,485 | 4/1978 | Kaplow et al. | 126/425 |
| 4,103,493 | 8/1978 | Schoenfelder | 60/641 |

Primary Examiner—Carroll B. Dority, Jr.
Attorney, Agent, or Firm—John H. Crowe; Fred N. Schwend

[57] ABSTRACT

A volatile liquid is circulated through a normally closed circuit, including expansion tubes within an expansion chamber where the sun's rays are focused on the tubes to heat the liquid, transforming it to an expanding gas to drive a fluid-operated motor, also in the circuit. The motor may drive a mechanical load or an electric generator. The generator drives a pump which compresses the gas back to a liquid state and returns the same to a reservoir and to the inlets of the expansion tubes in the expansion chamber. An air reservoir which is pressurized by a pump driven by the fluid operated motor has its outlet connected to the motor inlet so that during periods of darkness or cloud cover in which the volatile liquid is not expanded into a gas, the pressurized air will be automatically fed into the motor to continue to drive the same.

A gimbal system automatically controlled by sun tracking devices supports the expansion chamber to continually focus the sun's rays onto the expansion tubes, regardless of the relative position of the sun and the base on which the gimbal system is mounted.

11 Claims, 8 Drawing Figures

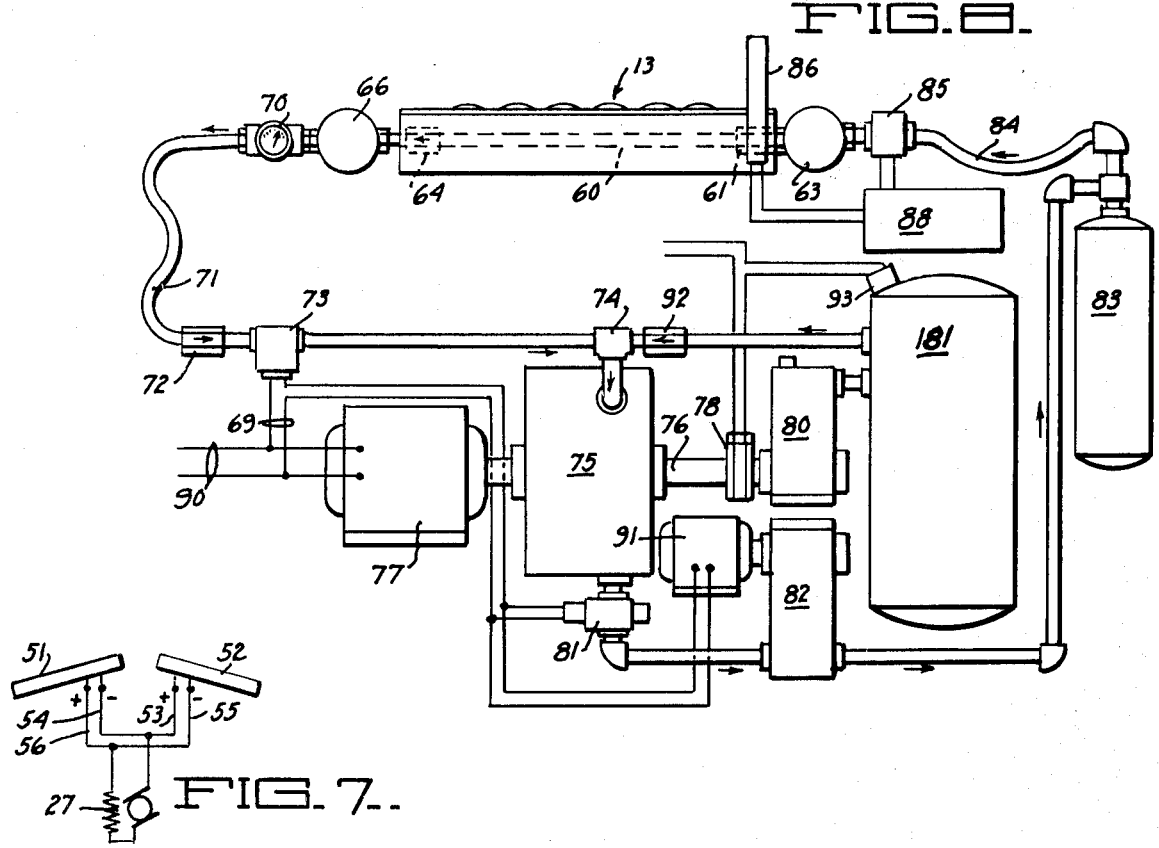
FIG. 8.
FIG. 7.
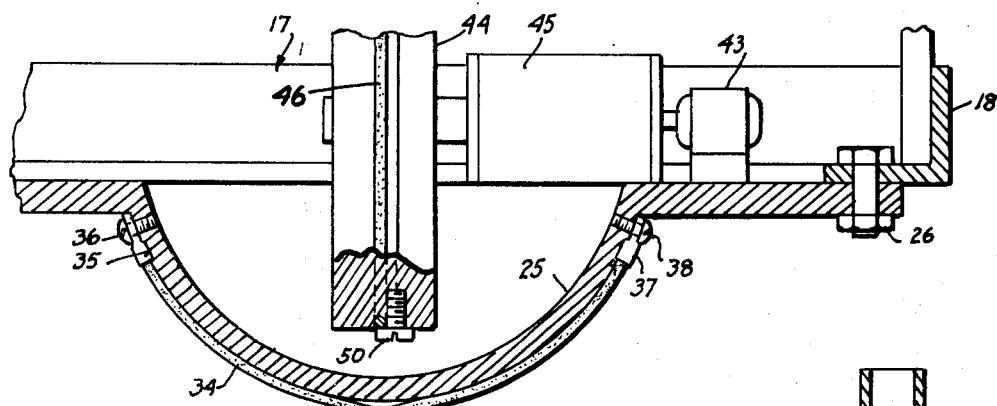
FIG. 5.
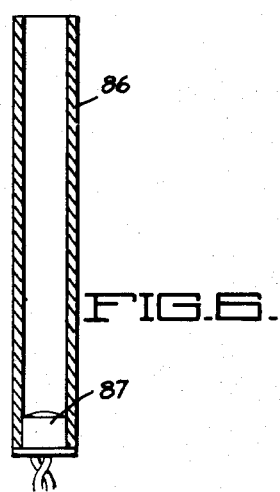
FIG. 6.

SOLAR POWER GENERATING SYSTEM

BACKGROUND OF THE INVENTION

1. Field of the Invention

This invention relates to solar power generating systems and has particular reference to apparatus for deriving power from the sun to provide both mechanical and electrical energy.

2. Description of the Prior Art

Heretofore, many attempts have been made to transform radiant energy received from the sun into electrical or mechanical energy. Generally, this has been accomplished by photo voltaic devices which directly transform the sun's rays into electrical energy. The latter can be used directly or can be transmitted to an electric motor to drive a mechanical load.

Although some measure of success has been accomplished, such photo voltaic power generating systems are expensive and, at their present stage of development, are relatively inefficient. Therefore, in order to generate an appreciable amount of power from the sun, a large number of photo voltaic devices must be employed which necessarily must cover a large area. Also, in order to most effectively utilize the sun's rays, the panels carrying the photo voltaic devices must be supported by relatively large and expensive gimbal structures which are suitably controlled to track the sun.

SUMMARY OF THE INVENTION

A principal object of the present invention is to provide a solar power generating system having a high degree of efficiency.

Another object is to provide a solar power generating system capable of generating a large amount of mechanical or electrical power for its size.

Another object is to provide a solar power generating system having an auxiliary stored energy source which automatically becomes effective when the sun's rays are temporarily cut off due to darkness, cloud cover or the like.

Another object is to provide a tracking means for a solar power generating system which will automatically track the sun over a relatively wide angle of transit.

A further object is to provide a solar power generating system which is relatively simple and inexpensive to manufacture.

According to the present invention, a volatile liquid having a low boiling temperature, is fed through a normally closed fluid circuit, including expansion tubes wherein radiant rays from the sun are focused upon the tubes to heat the same and thus transform the liquid into an expanding gas to drive a fluid operated motor located in the circuit. The motor may be coupled to a load to mechanically drive the same or it may be coupled to an electric generator to generate electricity. A pump, driven by power derived from the motor or generator, compresses the gas back into a liquid after it passes through the motor and circulates the same to a reservoir and to the inlets of the expansion tubes. The motor is also effective to drive an air pump to pressurize an air storage reservoir having its outlet connected to the inlet of the motor so that, in periods of time wherein the sun's rays are temporarily cut off, and thus no gas pressure is generated, the pressurized air from the air reservoir will automatically take over to operate the motor.

The sun's rays are focused on the expansion tubes by a focusing system composed of a plurality of transparent lenticular elements. The focusing system forms part of an expansion chamber. The chamber is carried by a gimbal system which is movable about axes located in planes perpendicular to each other. The gimbal system is automatically controlled by sun tracking means which continually position the expansion chamber in position to cause the focusing system to focus the sun's rays directly on the expansion tubes.

BRIEF DESCRIPTION OF THE DRAWINGS

The manner in which the above and other objects of the invention are accomplished will be readily understood on reference to the following specification when read in conjunction with the accompanying drawings, wherein:

FIG. 5 is an enlarged sectional view of part of the gimbal structure and is taken along line 5—5 of FIG. 1.

FIG. 6 is a sectional view through a photo voltaic switching device for controlling the flow of liquid into the expansion chamber.

FIG. 7 is an electric diagram showing the control circuit for one of the solar tracking devices.

FIG. 8 is a schematic diagram of the solar power generating system of the present invention.

DESCRIPTION OF THE PREFERRED EMBODIMENT

Figure 1:
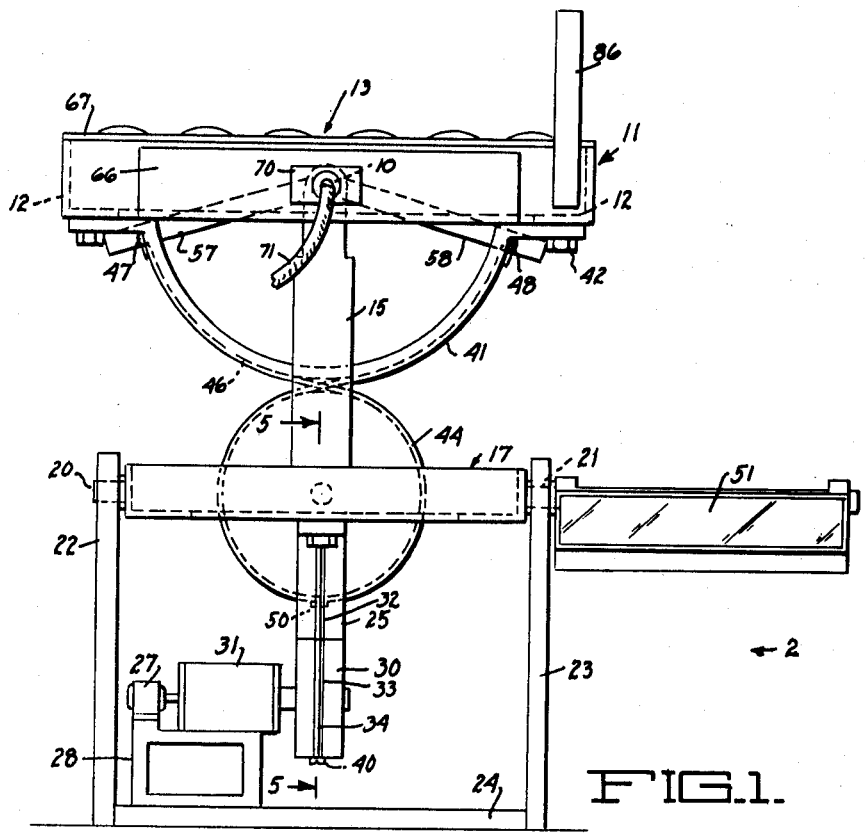
FIG. 1 is a front elevation view of a solar power generating system embodying a preferred form of the present invention.
Figure 2:
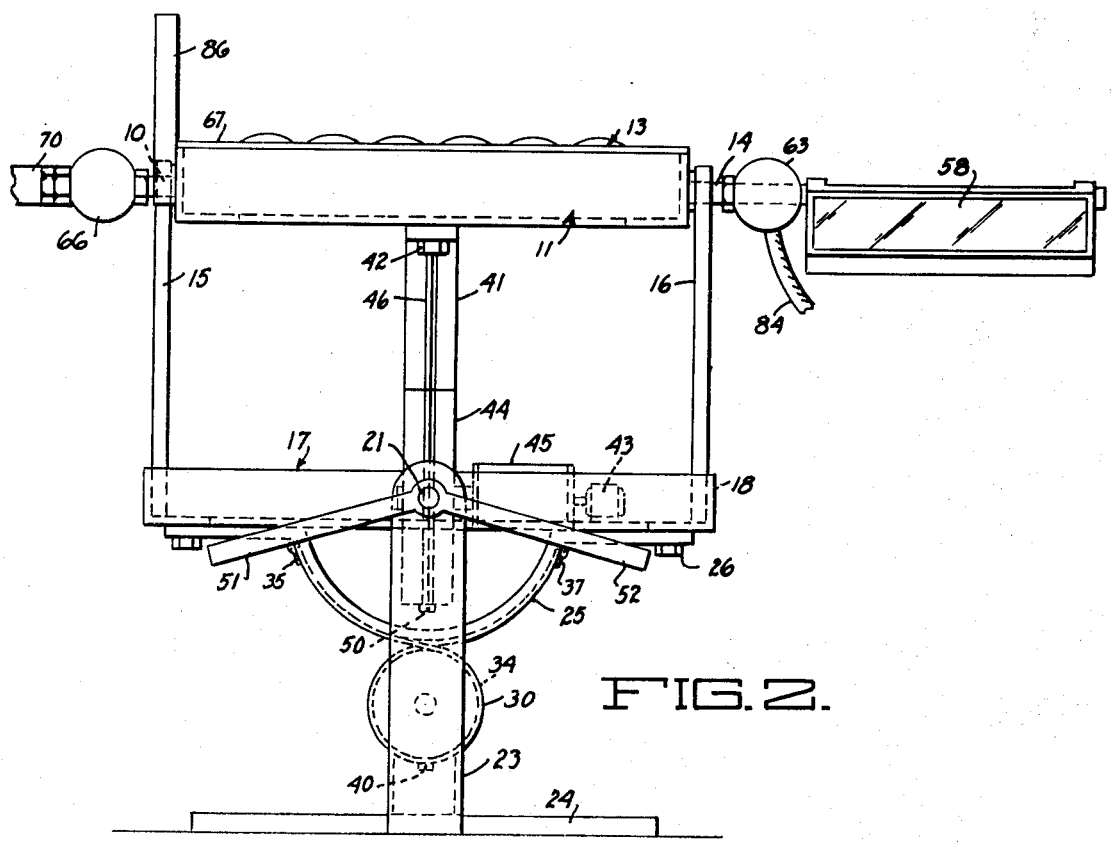
FIG. 2 is a side elevation view of the system and is taken in the direction of the arrow 2 in FIG. 1.

While this invention is susceptible to embodiment in many different forms, there is shown in the drawing and will be described in detail a certain specific embodiment, with the understanding that the present disclosure is to be considered as an exemplification of the principles of the invention and is not intended to limit the invention to the particular embodiment illustrated.

Describing first the gimbal structure, reference is made to FIGS. 1 to 5. A substantially square upper gimbal frame 11, formed of angle elements 12 around its perimeter, forms part of an expansion chamber, generally indicated at 13, to be described in detail later. The frame 11 is provided with coaxial bearing trunnions 10 and 14 which extend outwardly therefrom and are journaled in bearings formed in the upper ends of brackets 15 and 16, respectively. The latter are integrally secured at their lower ends to the sides of a rectangular lower gimbal frame 17. The latter is formed of angle elements 18 around its perimeter and is open in its central area.

The frame 17 is provided with coaxially extending bearing trunnions 20 and 21, extending outwardly therefrom with their axes located in planes extending perpendicular to the axes of the upper trunnions 10 and 14. The trunnions 20 and 21 are journaled in bearings formed in the upper ends of brackets 22 and 23, respectively, which are suitably secured to a support base 24.

Tracking means are provided to pivotally swing the frame 17 about the axes of the trunnions 20 and 21. For this purpose, an arcuate sector 25 is secured by bolts 26 to the under side of the frame 17. The sector 25 extends concentrically of the axes of trunnions 20 and 21.

A small tracking motor 27 is provided for swinging the frame 17. The motor 27 is mounted on a bracket 28, suitably secured to the base 24, and is coupled to a pulley 30 through a reduction gear unit 31, also mounted on the bracket 28. The pulley 30 is arranged to substantially engage the periphery of the sector 25.

Aligned peripheral grooves 32 and 33 are formed in the sector 25 and pulley 30, respectively, to receive a cable 34 (FIG. 5). The latter is secured at one end to one side of the sector 25 by a suitable lug 35 fastened to the sector by a screw 36. The cable is wrapped in a figure eight manner around the pulley 30 and is attached at its opposite end to the opposite side of the sector 25 by a second lug 37 secured to the sector by a screw 38. A third attaching screw 40 is threaded into the pulley 30 and clamps against the cable to attach the same to the pulley at that point. Thus, as the motor 27 is rotated, the pulley 30 will, through cable 34, positively and smoothly rotate the sector 25 and, therefore, the frame 17 about the trunnions 20 and 21. The peripheries of the pulley 30 and sector 25 retain the cable 34 in the grooves 32 and 33 at all times. This construction enables a wide angle of swing of the frame 17 about the trunnions 20 and 21.

The upper gimbal frame 11 is similarly provided with an arcuate sector 41 which is secured to the frame by bolts 42 and extends concentrically of the trunnions 10 and 14. A second tracking motor 43 is provided for swinging the frame 11 about the axes of trunnions 10 and 14. The motor 43 is mounted on the frame 17 and drives a pulley 44 through a reduction gear unit 45. Pulley 44 is substantially in engagement with the periphery of the sector 41 and drives the same in a manner similar to the drive for sector 25. That is, the sector 41 and pulley 44 have aligned peripheral grooves therein to receive a second cable 46 wrapped around the sector and pulley in a figure eight manner and attached at the opposite ends at 47 and 48 to the sector. A clamp screw 50 secures a mid portion of the cable to the pulley 44.

The tracking system for the lower gimbal frame 17 comprises a pair of flat panels 51 and 52 securely mounted on the trunnion 21 and thus movable with the frame 17. Each panel contains a number of upwardly facing photo voltaic cells, not shown, of conventional construction. It will be noted in FIG. 2 that the panels 51 and 52 are arranged at an angle to each other and at equal and opposite angles to the general plane of the frame 17.

Preferably, the motor 27 is of the DC series wound type having its terminals electrically connected to the photo voltaic cell panels 51 and 52 in the manner shown in FIG. 7. That is, the plus lead 53 of panel 52 is connected to the minus lead 54 of the panel 51 and to one terminal of the motor 27. Likewise, the minus lead 55 of panel 52 is connected to the plus lead 56 of panel 51 and to the opposite terminal of the motor 27. Accordingly, if the gimbal frame 17 is initially positioned with its general upper plane located at an angle of more or less than 90° from a line extending between the sun and the gimbal structure, a greater amount of the sun's rays will strike one or the other of the panels 51 and 52 to generate a voltage in the circuit of motor 27, causing operation of the motor in an appropriate direction to bring the frame 17 into position directly facing the sun, at which time the voltage generated by both panels 51 and 52 will be equal and opposite, allowing the motor 27 to come to rest.

A second pair of flat panels 57 and 58 containing a plurality of photo voltaic cells are securely mounted on the trunnion 14 at an angle to each other and at equal angles to the general plane of the upper gimbal frame 11 to move with the frame. The panels 57 and 58 are electrically connected to the tracking motor 43 in a manner similar to that shown in FIG. 7 so as to similarly automatically maintain the expansion chamber 13 in a position directly facing the sun. Accordingly, as the sun moves across the sky, or as the base 24 moves relative to the sun, as may be the case if the system were mounted on a movable vehicle, the tracking motors 27 and 43 will automatically adjust the gimbal structure to maintain the chamber 13 directly facing the sun.

The aforementioned photo voltaic cells and motors 27 and 43 are commercially available. For example, they may be purchased from Poly Paks, Inc. P.O. Box 492, South Lynnfield, Massachusetts.

Figure 3:
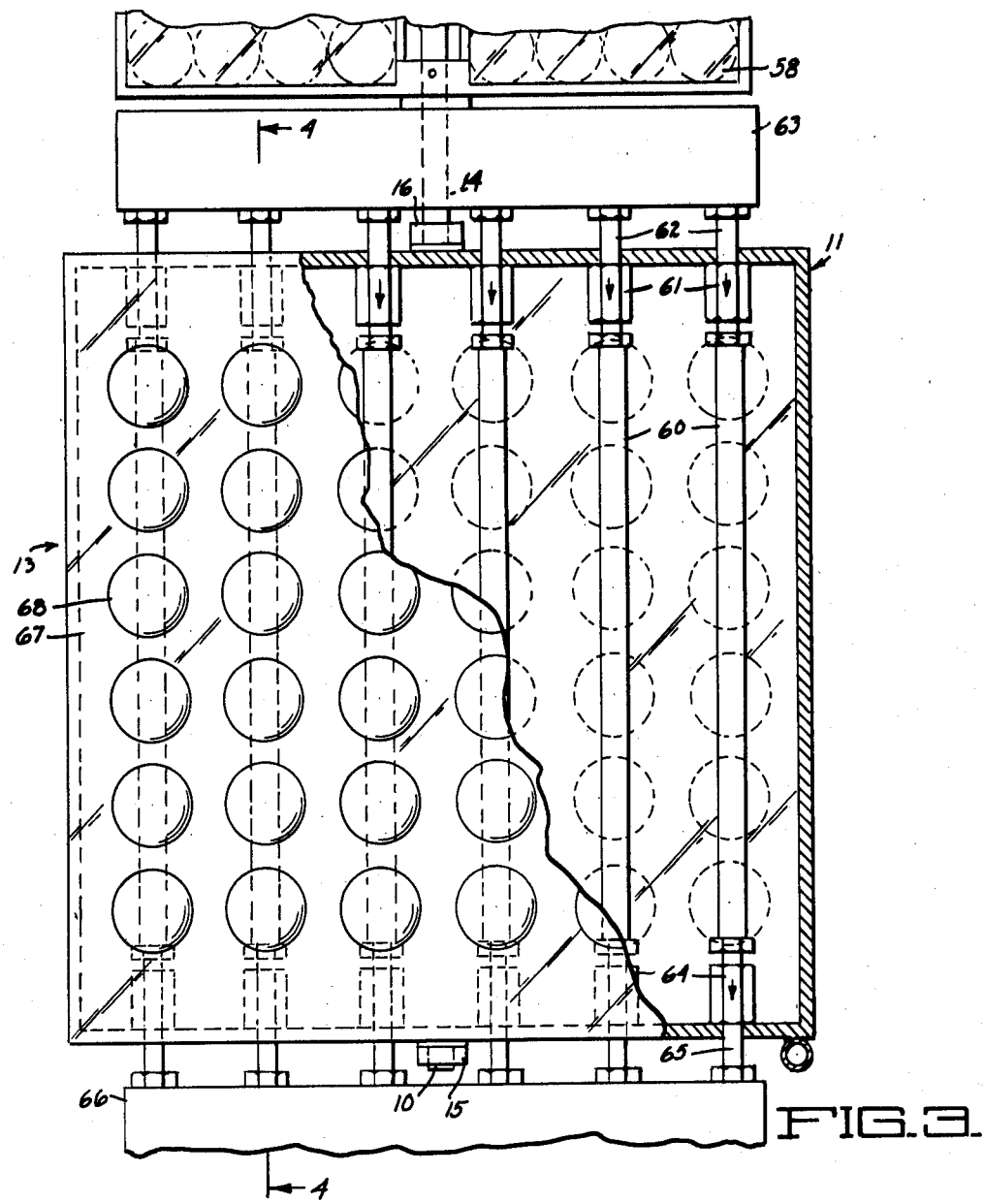
FIG. 3 is an enlarged plan view, partly in section, of the expansion chamber.
Figure 4:
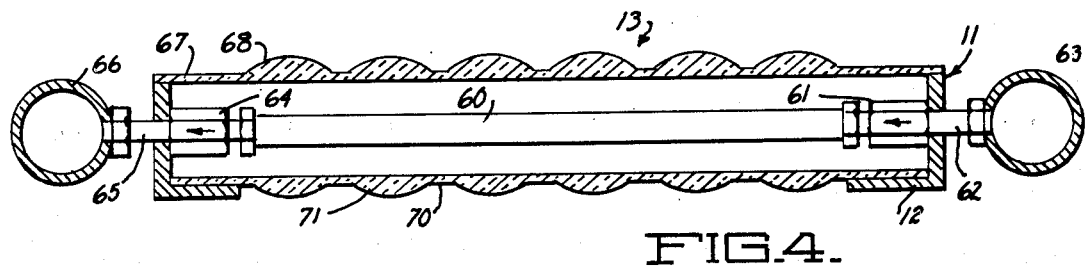
FIG. 4 is a sectional view through the expansion chamber and is taken along the line 4—4 of FIG. 3.

Describing now the expansion chamber 13 in detail, reference is made particularly to FIGS. 3 and 4. As shown therein, a plurality of expansion tubes or conduits 60 are located therein in a parallel relation to each other. Such tubes 60 are preferably formed of a material having a high coefficient of heat conduction, such as copper, coated with a dull black coating to absorb the rays and to transform such rays to heat. The inlet ends of tubes 60 are connected through check valves 61 and inlet conduits 62 to an inlet manifold 63. Likewise, the outlet ends of the tubes 60 are connected through check valves 64 and outlet conduits 65 to an outlet manifold 66.

An upper transparent plate 67, having a pattern of convex lenticular formations 68 formed thereon, is suitably secured along its edges to the upper edge of the frame 11. Preferably, the plate 67 is formed of plastic with the formations 68 molded thereon to transmit all of the radiant energy rays received from the sun. As shown in FIG. 3, groups of the formations 68 are aligned with underlying ones of the expansion tubes 60 and are formed to focus the sun's rays directly onto the tubes at spaced locations therealong.

A lower transparent plate 70, similar to plate 67, is suitably secured along its edges to the bottom of the frame 11 to thereby hermetically seal the chamber 13 to retain any heat developed therein by the sun's rays. The lower surface of plate 70 has lenticular formations 71 formed thereon which are coated with a suitable light and heat reflecting material. Thus, the lenticular formations 71 form concavities which are capable of reflecting the sun's rays passing through the upper plate 67 onto the under surface of the conduit tubes 60.

It will be seen from the above, a maximum amount of heat is generated in the chamber 13 and is directed against the various conduit tubes 60 to readily convert the volatile liquid passing into the tubes 60 into an expanding gas which is forced outwardly through the outlet check valves 64 and into the manifold 66.

Describing now the system for deriving power from the expanding gas generated in the expansion chamber 13, reference is had to FIGS. 6 and 8, in particular.

The outlet manifold 66 is connected through a pressure regulator 70, a flexible conduit 71, a check valve 72, and a flow responsive switch 73 of conventional construction, to the inlet 74 of a gas-operated turbine 75, forming a fluid-operated motor. The output shaft 76 of the turbine as coupled to an electric generator 77 and to an electrically controlled clutch 78 for driving an air pump 80 for pressurizing an air storage reservoir 181. A pressure sensing switch 93 is connected in circuit with the controls for the clutch 78 to release the clutch when the air pressure in reservoir 181 reaches a predetermined amount.

The fluid outlet of the turbine 75 is connected through a four-way solenoid valve 81 to the inlet of a pump 82, the outlet of which is connected to a reservoir 83. The latter is connected through a flexible tubing 84 and a normally closed two-way solenoid valve 85, to the inlet of the aforementioned inlet manifold 63.

The aforementioned normally closed fluid circuit is charged with a liquid having a low boiling temperature, preferably of the type commercially available as "Freon 22".

Means are provided to prevent circulation of the fluid through the circuit while the expansion chamber 13 is out of facing relation to the sun, as may occur prior to initiating operation of the system, so as to insure that none of the liquid fluid will be passed through the expansion tubes 60 before the latter have been brought to proper operating temperature. For this purpose, a sighting tube 86 (see also FIGS. 1, 2, 6 and 8) is mounted on the upper gimbal frame 11, pointing upwardly and aligned perpendicular to the general plane of the expansion chamber 13. A photo voltaic device 87 is mounted in the lower end of the tube 86 and is electrically connected through a suitable time delay relay 88 to the solenoid valve 85. When the gimbal system is out of tracking relation with the sun, the tube 86 will also be out of alignment with the sun and, therefore, the photo voltaic device 87 will not be activated and the valve 85 will remain closed. However, when the gimbal system is properly positioned to track the sun, the sun's rays, passing through the tube 86, will activate the device 87. After a time delay of approximately five minutes, as determined by the relay 88, and after the expansion chamber 13 and expansion tubes 60 have been heated, the valve 85 will be opened, permitting injection of the volatile liquid into the tubes 60.

Describing now the operation of the system, as the expanding gas flows through the pressure regulator 70 and check valve 72 to drive the turbine 75, the latter drives the generator 77 and the air pump 80. The flow responsive switch 73, in sensing such flow, completes a circuit 69 to connect the coil of solenoid valve 81 across the output circuit 90 of the generator 77, thus holding the valve 81 in a first condition wherein it transfers gas exhausted from the turbine 75 to the inlet of pump 82. The drive motor 91 of pump 82 is connected in parallel with the coil of valve 81 and therefore the pump will now operate to compress the gas into a liquid state and force the same into the reservoir 83 and into the inlet manifold 63 to continue recycling.

In cases where the sun becomes temporarily obscured, as, for example, during darkness of night, cloud cover, etc. insufficient gas pressure may be generated in the expansion tubes 60 to operate the turbine 75. Accordingly, switch 73 will open, disabling pump 81 and causing valve 82 to assume a second condition wherein it vents the exhaust from the turbine to the atmosphere. Concurrently, since gas pressure is reduced in the turbine inlet 74, air from the pressurized reservoir 181 will automatically feed through check valve 92 and into the turbine inlet 74 to continue to drive the turbine 75 until the pressurized air in reservoir 181 is exhausted or until sufficient heat is reestablished in the expansion chamber 13 to continue normal operation.

From the foregoing, it will be observed that numerous variations and modifications may be effected without departing from the true spirit and scope of the novel concept of the invention. It is, or course, intended to cover by the appended claims, all such modifications as fall within the scope of the claims.

I claim:

1. Apparatus for deriving energy from the sun comprising:
   a closed fluid circuit for a fluid,
      said fluid being normally in liquid form and having a low boiling temperature,
      said circuit including an expansion conduit and a fluid-operated motor arranged in series,
   a focusing device locatable in a focusing position to focus rays of radiant energy from the sun onto said expansion conduit whereby to transform said liquid into a gaseous fluid for operating said motor,
   means forming a base,
   gimbal means on said base for pivotally supporting said focusing device, and
   tracking means for pivoting said gimbal means to maintain said focusing device in said focusing position in different positions of said base relative to the sun, said tracking means comprising:
      drive means for said gimbal means,
      a pair of sensing devices for sensing rays of radiant energy from the sun and for emitting signals proportional to the amount of said rays falling thereon,
      each of said sensing devices receiving a maximum amount of said rays when directly facing the sun,
      means mounting such devices on said gimbal means to face in diverging directions, and
      means responsive to said emitted signals from said sensing devices for actuating said drive means.

2. Apparatus for deriving energy from the sun comprising:
   a closed fluid circuit for a fluid,
      said fluid being normally in liquid form and having a low boiling temperature,
      said circuit including an expansion conduit and a fluid-operated motor arranged in series,
   a focusing device locatable in a focusing position to focus rays of radiant energy from the sun onto said expansion conduit whereby to transform said liquid into a gaseous fluid for operating said motor,
   means forming a base,
   gimbal means on said base for pivotally supporting said focusing device, and
   tracking means for pivoting said gimbal means to maintain said focusing device in said focusing position in different positions of said base relative to the sun;
   said gimbal means comprising:
      a first gimbal supporting said focusing device for movement about a first gimbal axis, and
      a second gimbal supported by said base for supporting said first gimbal for movement about a second gimbal axis lying in a plane perpendicular to said first gimbal axis;
   said tracking means comprising:
      a first drive means for said first gimbal means,
      a pair of first sensing devices for sensing rays of radiant energy from the sun and for emitting signals proportional to the amount of said rays falling thereon, each of said first sensing devices receiving a maximum amount of said rays when directly facing the sun, means mounting such first sensing devices on said first gimbal means to face in diverging directions, means responsive to said emitted signals from said sensing devices for actuating said first drive means, a second drive means for said second gimbal means, a pair of second sensing devices for emitting signals proportional to the amount of said rays falling thereon, each of said second sensing devices receiving a maximum amount of said rays when directly facing the sun, means mounting said second sensing devices on said second gimbal means to face in diverging directions, and means responsive to said emitted signals from said sensing devices for actuating said second drive means.

3. Apparatus for deriving energy from the sun comprising:

a closed fluid circuit for a fluid,
said fluid being normally in liquid form and having a low boiling temperature,
said circuit including an expansion conduit and a fluid-operated motor arranged in series, a focusing device locatable in a focusing position to focus rays of radiant energy from the sun onto said expansion conduit whereby to transform said liquid into a gaseous fluid for operating said motor, means forming a base, gimbal means on said base for pivotally supporting said focusing device, and tracking means for pivoting said gimbal means to maintain said focusing device in said focusing position in different positions of said base relative to the sun, said gimbal means comprising:
a frame pivotally supported by said base for movement about a gimbal axis, and
an arcuate sector on said frame, the periphery of said sector being concentric with said gimbal axis, said tracking means comprising:
rotatable drive means on said base,
said drive means including a drive pulley at least substantially in contact with the periphery of said sector,
said pulley and said sector having peripheral grooves therein,
said drive means including, also, cable means extending along said grooves, and
said capable means being attached at one point on said pulley and at another point on said sector.

4. Apparatus for deriving energy from the sun comprising:

a closed fluid circuit for a fluid,
said fluid being normally in liquid form and having a low boiling temperature,
said circuit including an expansion conduit and a fluid-operated motor arranged in series, a focusing device locatable in a focusing position to focus rays of radiant energy from the sun onto said expansion conduit whereby to transform said liquid into a gaseous fluid for operating said motor, means forming a base, gimbal means on said base for pivotally supporting said focusing device, and tracking means for pivoting said gimbal means to maintain focusing device in said focusing position in different positions of said base relative to the sun, said apparatus also comprising:

means for circulating said fluid in said circuit, a flow control device normally preventing flow of fluid through said conduit, a sensing device carried by said gimbal means for sensing rays of radiant energy from the sun, said sensing device receiving a maximum amount of said rays only when said focusing device is located in said focusing position, and means responsive to said sensing device only when said sensing device receives said maximum amount of said rays for causing said flow control device to permit said flow of fluid in said circuit.

5. Apparatus for deriving energy from the sun comprising:

a closed fluid circuit for a fluid,
said fluid being normally in liquid form and having a low boiling temperature,
said circuit including an expansion conduit and a fluid-operated motor arranged in series, a focusing device locatable in a focusing position to focus rays of radiant energy from the sun onto said expansion conduit whereby to transform said liquid into a gaseous fluid for operating said motor, means forming a base, gimbal means on said base for pivotally supporting said focusing device, and tracking means for pivoting said gimbal means to maintain said focusing device in said focusing position in different positions of said base relative to the sun, said expansion conduit and said motor each having a fluid inlet and a fluid outlet, said apparatus also comprising:

means intermediate said motor outlet and said conduit inlet for circulating said fluid, a valve in said circuit intermediate said motor outlet and said circulating means, said valve being effective in a first condition to enable flow of said fluid in said circuit and effective in a second condition to vent said motor outlet to the atmosphere, a pressurized source of gas connected to said motor inlet, and a flow responsive device for sensing the flow of fluid in said circuit intermediate said conduit outlet and said motor light, said flow responsive device being effective upon sensing said flow of fluid to enable said circulating means and to cause setting of said valve in said first condition, and being effective on sensing an absence of flow of said fluid for disabling said circulating means and for causing setting of said valve in said second condition.

6. Apparatus as defined in claim 1 wherein said drive means comprises an electric motor and said sensing devices comprise panels of photoelectric elements electrically connected to said motor in a manner to cause said gimbal means to pivot to a position wherein said focusing device focuses said rays onto said expansion conduit.

7. Apparatus as defined in claim 3 comprising;

means for attaching said cable means to said sector on one side of said sector, said cable means extending in figure eight manner around said side of said sector and around said pulley and around the opposite side of said sector, means for attaching said cable means to said sector on the opposite side of said sector, and means for attaching said cable means to said pulley.

8. Apparatus as defined in claim 4 comprising
a time delay device for delaying operation of said fluid control device for a predetermined period of time after operation of said sensing device.

9. Apparatus as defined in claim 5 comprising one-way valve means for preventing reverse flow of said fluid from said expansion conduit through said inlet thereof.

10. Apparatus as defined in claim 5 wherein
said pressurized source of gas comprises a reservoir and a pump operable by said motor for pressurizing said reservoir.

11. Apparatus as defined in claim 10 comprising a first one-way valve means for preventing flow of said gas into said expansion conduit, and
a second one-way valve means for preventing flow of said fluid into said reservoir.

* * * * *